US010091973B2

(12) United States Patent  
Corke

(10) Patent No.: US 10,091,973 B2  
(45) Date of Patent: Oct. 9, 2018

(54) ANIMAL MANAGEMENT SYSTEMS

(71) Applicant: Commonwealth Scientific and Industrial Research Organisation, Campbell, ACT (AU)

(72) Inventor: Peter Ian Corke, Taringa (AU)

(73) Assignee: Commonwealth Scientific and Industrial Research Organisation (AU)

( * ) Notice: Subject to any disclaimer, the term of this patent is extended or adjusted under 35 U.S.C. 154(b) by 0 days.

(21) Appl. No.: 14/453,827

(22) Filed: Aug. 7, 2014

(65) Prior Publication Data

US 2014/0345539 A1    Nov. 27, 2014

Related U.S. Application Data

(63) Continuation of application No. 13/908,550, filed on Jun. 3, 2013, now abandoned, which is a continuation of application No. 13/270,041, filed on Oct. 10, 2011, now abandoned, which is a continuation of application No. 11/915,342, filed as application No. PCT/AU2006/000695 on May 24, 2006, now abandoned.

(30) Foreign Application Priority Data

May 24, 2005  (AU) ................. 2005902654

(51) Int. Cl.
*A01K 15/04*     (2006.01)
*A01K 15/02*     (2006.01)
*A01K 29/00*     (2006.01)

(52) U.S. Cl.
CPC .......... *A01K 15/023* (2013.01); *A01K 29/005* (2013.01)

(58) Field of Classification Search
CPC ...... A01K 15/00; A01K 15/02; A01K 15/021; A01K 15/023; A01K 15/029; A01K 27/009
USPC ........ 119/908, 721, 720, 719, 718, 712, 859
See application file for complete search history.

(56) References Cited

U.S. PATENT DOCUMENTS

| | | |
|---|---|---|
| 3,582,933 A | 6/1971 | Place |
| 5,241,923 A | 9/1993 | Janning |
| 5,636,597 A | 6/1997 | Van Curen et al. |
| 5,787,841 A | 8/1998 | Titus et al. |
| 5,791,294 A | 8/1998 | Manning |
| 5,799,618 A | 9/1998 | Van Curen et al. |
| 6,127,931 A | 10/2000 | Mohr |

(Continued)

FOREIGN PATENT DOCUMENTS

| | | |
|---|---|---|
| GB | 2329800 | 3/1999 |
| WO | 199933039 | 7/1999 |

*Primary Examiner* — Lisa L Tsang  
(74) *Attorney, Agent, or Firm* — Merchant & Gould P.C.

(57) ABSTRACT

The system for controlling and monitoring animals, the system including control devices that are able to be fitted to the animals and arranged for communication with one another. Each control device is capable of determining the position of an animal relative to a second animal as well as the distance between animals and the relative movement of animals fitted with the control device. The system of control devices also includes a stimulus device that allows stimuli to be applied to an animal or animals based on the relative position, movement and/or distance of the respective animals to one another.

11 Claims, 2 Drawing Sheets

(56) References Cited

U.S. PATENT DOCUMENTS

| | | | |
|---|---|---|---|
| 6,202,599 B1* | 3/2001 | Cutler | A01K 15/02 |
| | | | 119/859 |
| 6,232,880 B1 | 5/2001 | Anderson et al. | |
| 6,271,757 B1* | 8/2001 | Touchton | A01K 15/02 |
| | | | 119/721 |
| 6,529,131 B2 | 3/2003 | Wentworth | |
| 7,012,522 B1 | 3/2006 | Le Van | |
| 7,385,513 B2 | 6/2008 | Everest et al. | |
| 2002/0196151 A1* | 12/2002 | Troxler | G01C 21/005 |
| | | | 340/573.4 |
| 2005/0000469 A1 | 1/2005 | Giunta et al. | |
| 2005/0034683 A1* | 2/2005 | Giunta | A01K 15/023 |
| | | | 119/721 |
| 2005/0200487 A1 | 9/2005 | O'Donnell et al. | |
| 2006/0180093 A1 | 8/2006 | Cross et al. | |
| 2007/0044732 A1 | 3/2007 | Araki et al. | |
| 2008/0173255 A1 | 7/2008 | Mainini et al. | |
| 2012/0111286 A1* | 5/2012 | Lee | A01K 11/008 |
| | | | 119/719 |

\* cited by examiner

ANIMAL MANAGEMENT SYSTEMS

This application is a Continuation of Ser. No. 13/908,550, filed 3 Jun. 2013, which is a Continuation of Ser. No. 13/270,041, filed 10 Oct. 2011 which is a Continuation of Ser. No. 11/915,342, filed 23 Nov. 2007, which is a National Stage Application of PCT/AU2006/000695, filed 24 May 2006, which claims benefit of Ser. No. 2005902654, filed 24 May 2005 in Australia and which applications are incorporated herein by reference. To the extent appropriate, a claim of priority is made to each of the above disclosed applications.

FIELD OF THE INVENTION

This invention relates generally to the field of electronically controlling and monitoring animals.

BACKGROUND OF THE INVENTION

Traditionally, physical fences have been used to contain livestock within defined areas. More recently, virtual fencing devices have been described for attachment to animals. Generally, these devices use the application of auditory and/or electrical stimuli to control the spatial location of the animal.

A number of inventions have addressed the issue of virtual fencing in general, but each of these devices rely on the presence of a central controller to determine, for example, the location of the animal, the location of virtual boundaries, when to apply and stop applying stimuli, etc. While these devices work satisfactorily, they are limited by inherencies of the detector devices used, eg the range of a GPS satellite network, locations of buried wires, location of a central transmitter and/or receiver, etc.

U.S. Pat. No. 5,241,923 (Janning) discloses a system for controlling animals using transponders and a central transmitter. This system may also be used to separate animals by affixing transponders to the animals in order to signal when they are getting too close, as determined by the central transmitter. This system applies stimulus to animals when the distance between them is less then the minimum distance programmed, without any communication between the transponders or determination, for example, as to which animal should receive the stimulus or for how long the stimulus should be applied.

One objective of the present invention is to provide a system for controlling and monitoring animals that can work when a central controller is out of reach or not present at all.

SUMMARY OF THE INVENTION

In one broad aspect, the present invention provides a system for controlling and monitoring at least two animals, including control devices that are adapted to be fitted to said animals and arranged for communication with one another, wherein each control device includes distance and movement processor means for determining the distance of said control device relative to other control devices and/or determining relative movement of said control device with respect to other control devices, and trigger signal generating means arranged to generate a trigger signal upon comparison of the determined distance and relative movement values with one or more predetermined or situation-dependent selectable distance and relative movement threshold valued deviating from allowable values thereof.

The system further including at least one stimulus application device that is adapted to be fitted to at least a selected one of said animals and arranged for selective application of a stimulus to the animal upon activation by the trigger signal.

In another broad aspect thereof, the present invention also provides a method for localised controlling and monitoring of at least two animals, including determining the distance and relative movement of a first animal with respect to a second animal at a location of the first and/or the second animal, and selectively applying a stimulus to one or more of the animals upon comparison of the determined distance and relative movement values with one or more predetermined or situation-dependent selectable distance and relative movement threshold values deviating from allowable values thereof.

Before turning to the presentation of additional and/or optional features, as well as providing further definition of preferred forms of the above identified components of the system, it is best to provide a brief description of a number of simplified scenarios in which the invention in its broad concept may find application.

Assume first that the system is to be employed to control and monitor only two animals, in one case two steers and in another one steer and a cow. In the first case, it would be pertinent for both steers to be fitted with one control and one stimulus application device each. The control devices are devised to determine and register the relative position of the steers to one another, eg the absolute distance between the animals in meters, without relying on a central controller that is separate from the devices carried by the animals. For as long as the control devices register that the determined distance is greater than say a 25 m distance, which is stored in the control devices as the threshold minimum distance, no stimulation of any of the animals will take place. Equally, when one or both animals are moving, either maintaining the initial distance from one another or in directions that do not reduce this distance, the control devices will register and determine such movement pattern, and while the distance that is maintained between the animals does not decrease below (ie deviate from) the allowable 25 m distance, no stimulation trigger signal will be generated.

If, on the other hand, one of the steers is stationary, and the other moves (in direction and speed) towards the stationary animal in a manner which the pre-stored threshold values indicate to constitute a 'charging bull situation', then a trigger signal will be generated by the signal generating device of the control device carried by the charging animal only, thus commencing with application of a 'negative' stimulus to the steer, eg an electric shock of predetermined intensity (or of an intensity that increases once and if a further distance threshold between the animals is determined by the control device to have been under-stepped) which is aimed at stopping the animal; the stimulus may be applied only for a short period, eg as a shook stimulus, and not be re-applied if the steer stops. A different type of stimulus may then be applied to the stopped animal, if the steer is still within the minimum allowable distance between the animals, in order to encourage it to move away from the other steer. In order to allow the animal to react to different stimuli in a desired fashion, it will of course be necessary to 'educate' the animal to exhibit a desired behaviour in response to a given stimuli. Given the aggressive nature of bulls, it is of course imperative that the other steer also be fitted with a stimulus application device so as to be able to control and monitor the behaviour of both animals.

In contrast, in the case of a steer and cow situation described above, it is only necessary to fit the bull with a stimulus application device, whilst both animals carry a control device, given that the more passive nature of a cow may not require active controlling of it (rather only monitoring), and a desired behavioural reaction or interaction between the animals (eg keeping the animals apart) may be achieved by selective stimuli application and control of the bull alone.

The control devices may incorporate additional processor and data storage functionality as well as additional sensor devices to allow monitoring and controlling behaviour (or other environmental interaction indicators) of one or more animals as a function of these other indicators, for example expanded system in which the control devices are programmed with animal identification data of the animal to which the device is fitted, thereby allowing implementation of a more complex set of rules upon which selective stimuli application will be based, as is explained in more detail below.

It will become immediately apparent from the above exemplification, that the system can be employed in the control end monitoring of a plurality of animals, such as herds of sheep or horses. In the latter case, for example, if the herd consists of 1 stallion and 10 mares, whilst control devices of the type described above would be fitted to all animals, for monitoring purposes it might be possible to only fit the stallion with a stimulus application device to control the herd as a unit as well as stimulate a desired or prevent an undesired interaction of the stallion with one or more of the mares within the herd.

As noted above, herein below follow preferred developments and other aspects of the above described broad concept of the present invention.

In one implementation of the invention, the control devices of the system also include processor means for determining the absolute and/or relative position of the control devices, thus enabling additional monitoring of location of the animals within a defined environment.

In a preferred form, the control devices themselves have the processing and storage capability for processing the determinations made and effect comparison thereof with stored predetermined allowable threshold values for relative position, distance and/or movement (ie speed and direction), thereby providing a system that is independent from a central controller in so far as real time data processing requirements are concerned.

The monitoring and controlling of the animals is thus performed without the need for a central controller to monitor animal behaviour (eg movement) in real time. Responsibility for actively controlling interaction of the animals, by issuing stimuli application signals in response to detected animal behaviour, is effected locally at each control device. Notwithstanding this, a central controller may be employed to upload or download control device resident data either intermittently or continuously, and assist in computation of more elaborate behaviour normative control patterns where such are desired.

Thus, the control devices need to have sufficient "independency" or autonomy to carry out local control, but may rely on a central controller to perform more elaborate computation work on the signals provided by the different determination means, it will also be appreciated that the central controller may provide additional data to the control devices as may be required in certain circumstances.

It will be appreciated that the devices could be worn externally by the animal as a collar or ear tag, or implanted fully or partly, eg embodied in a micro chip implanted in the animal, with an external power source.

The invention was initially conceived in the context of ruminant animal control, eg. bulls in a common paddock, to prevent undesired interactions. It will be appreciated, however, that the inventive system/method can be used for other animals. One possible application envisages control of humans, for instance in detention facility situations.

Incorporation of a radio signal transmitter and receiver into the control devices provides the advantage of allowing determination of the relative position, distance and/or movement of the animals based on signal strength evaluation, pinging or some other techniques known in telemetry.

It is further preferred that determining whether a stimulus (and strength or intensity thereof) needs to be applied to one or more of the animals may include additional attributes not related to relative position, distance and/or movement. This provides the advantage of allowing the stimulus to be applied/stopped based on a number of additional factors, such as environmental attributes, animal identity, sex, behaviour and/or posture.

In a further preferred embodiment the control devices are arranged to allow data transmission along a chain of said control devices, eg so that data sampled and determined by a first control device, which is representative of a first animal's behaviour, can be passed on control devices carried by other animals in the vicinity of the first animal. In such case, the data transmitted would include a unique control device identifier, thus allowing identification of individual animals.

This then provides the advantage that such data can be passed from control device to control device until it is within range of, for example, a data reader or data storage device which then allows sampling and storage of an animal's behaviour pattern over time by a central controller.

It will be appreciated that control devices may also be arranged to collect data from other sensors attached to infrastructure such as gates, water troughs, and/or water/food supplement equipment, eg such as present in farms, thereby allowing determination of a more comprehensive historical behaviour picture. Equally, however, the data provided by these other sensors may be employed as an additional attribute upon which stimuli application may be effected on an animal.

As alluded to above, in further preferred embodiment, the system may include one or more secondary sensors associated with the control devices for monitoring animal centric and/or environmental attitudes, such as external temperature, internal temperature, etc. This provides the advantage of being able to sample further information as to an animal's behaviour in response to environmental factors, such as neck angle sensors to determine grazing or mating habits, a 'bite' meter to provide information about nutrition and spatial pasture usage, an internal physiological sensor, a pedometer to determine how far the animal walks, etc.

In a further preferred embodiment, the control devices are arranged to allow data to be acquired and/or provided to, a selected control device.

This then provides the advantage of allowing information as to a specific animal's behaviour to be sampled and stored as required.

In a more limited aspect of the inventive system, there is provided a system for controlling and monitoring at least two animals, including control devices that are adapted to be fitted to animals and arranged for communication with one another, wherein each control device includes:

means for determining the position of the animals fitted with such control device;

means for determining the distance between the animals;

means for determining movement of the animals relative to one another;

the system further including:

at least one stimulus application device arranged selective application of a stimulus to an animal carrying said device, the stimulus application device being arranged to be responsive to one or more of the control devices; and means for determining the need to apply a stimuli to the animal in response to the determination of at least one of the relative position, distance end movement and comparison thereof with one or more predetermined or situation-dependent selected attributes thereof.

In another aspect, the present invention provides a method for controlling and monitoring at least two animals, including at least two control devices of the types previously described, the method including the steps of:

a) determining the position of a first said animal relative to a second said animal;

b) determining the distance between first said animal and a second said animal;

c) determining movement of said first and second initials relative to one another;

d) initiating stimulus application to one or more selected animals in response to the determination of at lost one of the relative position, distance and movement and comparison thereof with one or more predetermined or situation-dependent selected attributes thereof;

e) stopping stimulus application to one or more selected animals after the end of a predefined stimulus application period or in response to a comparison of at least one of the determined relative position, determined distance and determined movement with one or more predetermined or situation-dependent threshold values thereof deviating by a set amount.

In yet another aspect, the present invention provides an apparatus for the controlling and monitoring of at least two animals including at least two control devices that are adapted to be fitted to said animals and arranged for communication with one another, each control device including:

a microprocessor for continuously determining the distance of a first said animal relative to a second said animal and to determine movement of said first and end animals relative to one another; and a stimulus unit for applying a sensory stimulus to at least one of the animals in response to signals received from the microprocessor;

wherein the microprocessor programmable such that if predetermined stimulation rules are satisfied, a stimulus is applied to at least one of the animals and the stimulus is withdrawn when a predetermined outcome is achieved.

Further features and advantages of different aspects of the invention will become apparent from the following description of a preferred implementation of the invention, which is provided with reference to the accompanying drawings.

DESCRIPTION OF PREFERRED EMBODIMENT

The following description discusses a system, method and apparatus for controlling and monitoring animals using communication between control devices attached to the animals.

Figure 1:
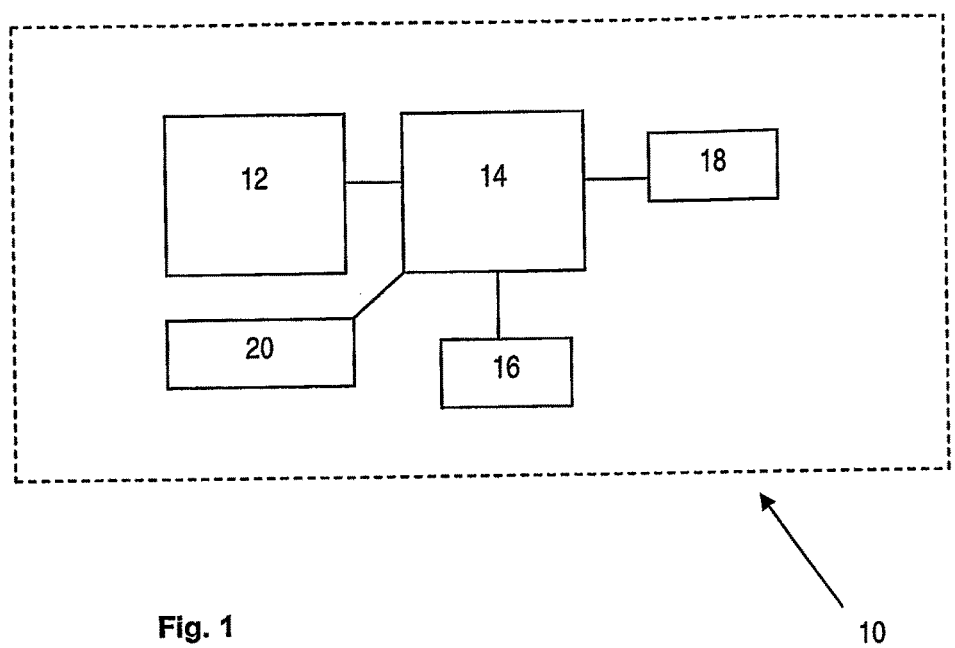
FIG. 1 illustrates a block diagram of an apparatus for the virtual fencing of a animal in accordance with one embodiment of the present invention.

Referring to the drawings, FIG. 1 shows in block-functional illustration, an apparatus 10 for the control and monitoring of an animal. The apparatus 10, is fitted to a collar (not shown) which is worn around an animal's neck (also not shown).

The apparatus 10 includes a stimulus unit 12 effective for applying an electric shock, typically to the top of the animal's neck. A microprocessor 14, is provided which operates in conjunction with an accelerometer 16, the latter arranged to detect small changes in velocity of the apparatus 10 when carried by the animal. The apparatus 10 also includes a communication module in the form of a transmitter/receiver 20, which is in communication with the microprocessor 14 and transmits signals to, and receives signals from similar collars (apparatus 10) fitted to other animals. Signals and the strength of the signals received by the transmitter/receiver 20 are input to the microprocessor 14 which then is able to compute and determine the position of an animal relative to a target, ie another animal.

In an alternate simplified embodiment, apparatus 10 on one animal may include only transmitter while an apparatus on another animal may include only a receiver.

It will be appreciated that GPS technology may be advantageously be incorporated in apparatus 10 and used in conjunction with the above methods of determining the relative position (eg distance) of the animals, to determine the actual positions of the animals within a virtual and/or physical fence.

Apparatus 10 also incorporates an electronic compass 18 to provide signals representative of and allow determination of the direction of small movements made by the animal. Such information is required to indicate direction (orientation) of movement patterns of the animals.

The apparatus 10 may optionally also include a neck angle monitor to identify and/or log when an animal's neck is, for example, pointed downward indicating that the animal is grazing or drinking water. Such additional information is of interest in seeking to identify a specific behaviour of the animals, eg allowing determination of whether a group of animals fitted with the apparatus 10 exhibit a common behaviour at a give location.

The apparatus 10 are devised such as to enable data, such as behavioural data, to be transmitted to, and received by closely located, similar apparatus, in a chain-like manner, in order to bring the data within range of one or more data readers or data storage devices located for example on a fixed structure or a vehicle. It will be appreciated that this data relaying function could also be used to transfer data from sensors attached to fixed infrastructure such as gates, water troughs, water or food supplement equipment commonly found in farms.

The system and its component apparatus 10 are further devised such that the data sampled and stored by apparatus 10 can be acquired from a specific one of the apparatus, typically by means of directional antenna "gun" which is pointed at a specific animal. Alternatively, or in addition to, the directional antenna "gun" may also be used to load data onto a specific apparatus 10, typically to change stimulation rules and/or other parameters stored in the apparatus 10 and applicable to one or more of the animals. It will be appreciated that some of the data could be animal specific tag data that can be used, for example, to control the behaviour of gates, feeders or troughs.

The microprocessor 14 of apparatus 10 is programmed with data including the stimulation rules which must be satisfied in order for stimulus to be applied to one or more of the animals, the type of animal, logic for determining which animal(s) the stimulus is applied to logic for calculating the duration of application of stimulus to the animal(s), and intensity data relating to the intensity at which the stimulus is to be applied when the stimulation rules are met.

The stimulation rules may be, for example, something as simple as solely the distance between two animals. In this way animals can be kept separate, for example, in order to avoid them mating or induced to come together, for example, to induce mating. The stimulation rules may also be more complex and may include, for example, a determination that the two animals are male and are travelling towards each other at a certain velocity, before any stimulus is applied. In this way animals such as bulls can be prevented from fighting.

Figure 2:
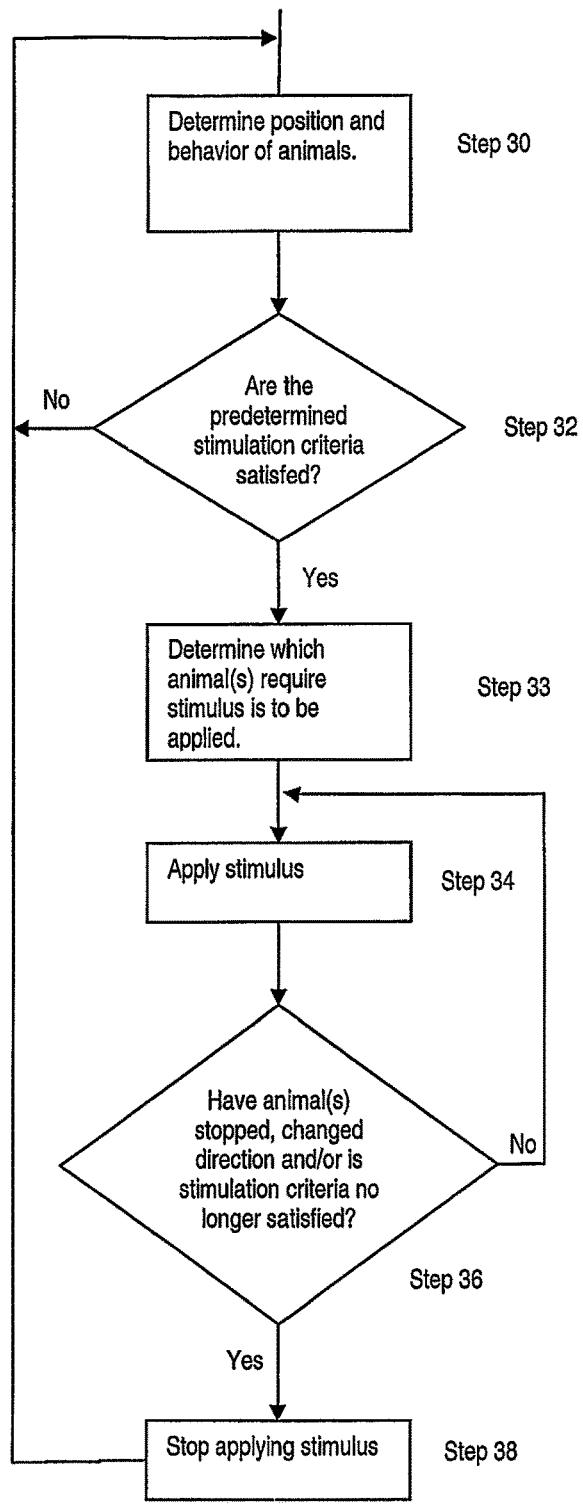
FIG. 2 illustrates a schematic flow chart illustrating steps used to determine when to apply the stimulus and when to withdraw the stimulus in operation of the apparatus of FIG. 1.

FIG. 2 illustrates an example sequence of steps used to determine when to apply the stimulus to an animal and when to withdraw the stimulus. The position and behaviour of the animals, including distance velocity and direction of movement is first determined at step 30. This data is compared with threshold values that provide the predetermined stimulation rules, in step 32. For example the stimulation rule set can include data according to which certain individual animals are not allowed to come closer than a minimum safe interaction distance. Consequently, where it is detected that these animals are moving towards each other or one animal is moving towards the other and the minimum distance is reached, then the microprocessor 14 determines in accordance with the set rules whether stimulus needs to be applied to one or more of these animals, step 33, and than controls the stimulus unit 12 to apply the necessary, behaviour inducing stimulus to the animals, step 34. The behaviour of the animals is monitored continuously and the applied stimulus may be maintained until it is verified that the animals have stopped, moved away from each other or another stimulation criteria is otherwise no longer satisfied, step 36. The stimulus then is removed, step 38. The position and behaviour of the animals is then re-determined as per step 30, and the cycle repeats itself.

It can be demonstrated, that with the above described method and system, it is possible to train animals such as bulls to exhibit a desired behaviour, wherein the apparatus 10 serve the purpose of providing monitored and controlled negative reinforcement to remove undesired behaviour of individual animals as well as group of animals.

It can be equally demonstrated that animals fitted with apparatus 10 and working under the inventive methodology 'learn' to avoid behaviour that leads to unpleasant application of negative stimuli, ie over time, the frequency of application of negative stimuli decreases.

The described method and system allow for fine tuning of behavioural patterns and are easily adaptable to changed situations, given that the described predetermined stimuli rules set can adapted in simple manner (software/data base implementation) and an updated or revised eat be downloaded into apparatus 10 as required. For example, experiments conducted with numerous species of animals have shown that the duration and intensity of stimulus required to induce certain behaviour (eg stop the animal from doing a certain action) may vary between animals of the same species. Further, animals rapidly learn to associate stimulus patterns with desired behaviour. Furthermore, it can be shown that the strategy of applying stimuli only until an animal stops movement is an effective method of controlling animal movement.

It is believed that the methodology and system are an improvement over former systems and will likely make virtual fencing an economically viable option.

It will be appreciated by persons skilled in the art that numerous variations and/or modifications may be made to the invention as atom in the specific embodiments without departing from the spirit or scope of the invention as broadly described. The present embodiments are, therefore, to be considered in all respects as illustrative and not restrictive.

What is claimed is:

1. A system for controlling and monitoring at least a first and a second animal, the system comprising:
    at least a first and a second control device, each arranged for communication with one another, the first control device adapted to be fitted to the first animal, and the second control device adapted to be fitted to the second animal, wherein each of the first and second control devices includes:
        a communication module, the communication module including a transmitter and a receiver configured to transmit and receive radio frequency signals to communicate directly with at least the other of the first or second control devices,
        a distance and movement processor, wherein the distance and movement processor determines a distance of said control device relative to other control devices and determines relative movement of said control device with respect to at least the other of the first or second control devices using the radio frequency signals,
        a trigger signal generator arranged to generate a trigger signal upon comparison of values of the determined distance and relative movement with one or more predetermined or situation-dependent selectable distance and relative movement threshold values, respectively, and
    at least one stimulus application device that is adapted to be fitted to at least a selected one of said animals and arranged for selective application of a stimulus to the animal upon activation by the trigger signal,
    wherein the trigger signal generator is arranged to generate the trigger signal upon determination that each of:
        a) the value of the determined distance is less than a threshold value of the one or more predetermined or situation-dependent selectable distance threshold values, thereby indicating that the first animal and the second animal are closer than an allowable interaction distance; and
        b) the value of the determined relative movement of the first control device relative to the second control device exceeds a threshold value of the one or more predetermined or situation-dependent selectable relative movement threshold values, thereby indicating that at least one of the first animal and the second animal is travelling towards the other of the first animal and the second animal above an allowable velocity;
    wherein the distance and movement processor is configured to determine a first velocity of the first animal and a second velocity of the second animal and to determine the value of the determined relative movement based on the determined first velocity and the determined second velocity.

2. The system according to claim 1, wherein each of the first and second control devices further includes:
a storage device operable to store the one or more predetermined or situation-dependent selectable distance and relative movement threshold values, and a processor operable to determine the distance and the relative movement and further operable to effect comparison thereof with the predetermined or situation-dependent selectable distance and relative movement threshold values.

3. The system according to claim 1, wherein each of the first and second control devices further utilize additional attributes not related to relative distance and movement to determine whether the stimulus, and strength or intensity thereof, needs to be applied to one or more of the animals.

4. The system according to claim 3, wherein said additional attributes include one or more of environmental attributes, animal identity, sex and behavior.

5. The system according to claim 1, wherein each of said first and second control devices are arranged to allow data transmission along a chain of said control devices.

6. The system according to claim 5, wherein said data includes a unique control device identifier.

7. The system according to claim 1, the system further including one or more secondary sensors associated with each of said first and second control devices for monitoring animal centric and/or environmental attributes.

8. The system according to claim 1, wherein each of the first and second control devices are arranged to allow data to be acquired from and/or provided to, a selected control device.

9. The system according to claim 1, wherein the trigger signal generator is arranged to stop generating the trigger signal upon determination that at least one of:
a) the value of the determined distance is greater than the threshold value of the one or more predetermined or situation-dependent selectable distance threshold values, thereby indicating that the first animal and the second animal have moved away from each other by more than the allowable interaction distance; and
b) the value of the determined relative movement is zero, thereby indicating that the first animal and the second animal have stopped.

10. The system according to claim 9, wherein the at least one stimulus application device is adapted to remove the stimulus when the trigger signal generator has stopped generating the trigger signal.

11. The system according to claim 1, wherein the at least one stimulus application device is adapted to be fitted to both the first animal and the second animal; and
wherein the trigger signal is configured to activate the at least one stimulus application device fitted to the at least one of the first animal and the second animal travelling towards the other of the first animal and the second animal.

* * * * *